(12) United States Patent
Gmuender et al.

(10) Patent No.: US 10,033,830 B2
(45) Date of Patent: Jul. 24, 2018

(54) REQUESTING WEB PAGES AND CONTENT RATING INFORMATION

(71) Applicant: SonicWALL US Holdings Inc., Santa Clara, CA (US)

(72) Inventors: John E. Gmuender, San Jose, CA (US); Alex M. Dubrovsky, San Mateo, CA (US); Nikolay V. Popov, Cupertino, CA (US); Alexander Shor, Sunnyvale, CA (US); Roman Yanovsky, Los Altos, CA (US); Shunhui Zhu, San Jose, CA (US); Boris Yanovsky, Saratoga, CA (US)

(73) Assignee: SonicWALL Inc., Milpitas, CA (US)

(*) Notice: Subject to any disclaimer, the term of this patent is extended or adjusted under 35 U.S.C. 154(b) by 0 days.

(21) Appl. No.: 15/210,259

(22) Filed: Jul. 14, 2016

(65) Prior Publication Data

US 2016/0323415 A1    Nov. 3, 2016

Related U.S. Application Data

(63) Continuation of application No. 14/638,298, filed on Mar. 4, 2015, now Pat. No. 9,405,839, which is a continuation of application No. 13/226,376, filed on Sep. 6, 2011, now Pat. No. 9,015,199, which is a
(Continued)

(51) Int. Cl.
*G06F 17/30* (2006.01)
*H04L 29/08* (2006.01)
*H04L 29/12* (2006.01)
*H04L 29/06* (2006.01)

(52) U.S. Cl.
CPC ........ *H04L 67/32* (2013.01); *G06F 17/30861* (2013.01); *G06F 17/30867* (2013.01); *H04L 61/1511* (2013.01); *H04L 63/0281* (2013.01); *H04L 63/0428* (2013.01); *H04L 67/02* (2013.01)

(58) Field of Classification Search
CPC ........ G06F 17/30861; G06F 17/30867; H04L 67/32; H04L 61/1511; H04L 63/0281; H04L 63/0428; H04L 67/02
See application file for complete search history.

(56) References Cited

U.S. PATENT DOCUMENTS

| 5,706,507 A * | 1/1998 | Schloss ........... H04L 12/14 707/754 |
| 6,003,030 A | 12/1999 | Kenner et al. |
| 6,061,692 A | 5/2000 | Thomas et al. |

(Continued)

OTHER PUBLICATIONS

"Cerberian Web Filter," http://products.enterpriseitplanet.com/security/fm/1062023449.html, Enterprise IT Planet Product Guide, 5 pages.
(Continued)

*Primary Examiner* — Jared M Bibbee
(74) *Attorney, Agent, or Firm* — Polsinelli LLP

(57) ABSTRACT

A method and an apparatus request web pages and content rating information thereof have been disclosed. In one embodiment, the method includes receiving a request from a user for a web page, retrieving content rating of the web page in response to the request, and fetching the web page substantially simultaneously with the retrieving of the content rating in response to the request. Other embodiments have been claimed and described.

20 Claims, 4 Drawing Sheets

Related U.S. Application Data continuation of application No. 10/853,557, filed on May 24, 2004, now Pat. No. 8,015,169.

(56) References Cited

U.S. PATENT DOCUMENTS

| | | | | |
|---|---|---|---|---|
| 6,144,996 | A * | 11/2000 | Starnes | G06F 17/30899 707/E17.119 |
| 6,415,368 | B1 * | 7/2002 | Glance | G06F 17/30902 707/E17.12 |
| 6,502,125 | B1 | 12/2002 | Kenner et al. | |
| 6,725,380 | B1 * | 4/2004 | Forlenza | G06F 17/30867 707/E17.109 |
| 6,772,214 | B1 * | 8/2004 | McClain | G06F 17/30902 707/999.01 |
| 6,829,653 | B1 | 12/2004 | Tout | |
| 6,981,029 | B1 * | 12/2005 | Menditto | H04L 29/12113 709/217 |
| 7,089,246 | B1 * | 8/2006 | O'Laughlen | G06F 17/30867 707/784 |
| 7,769,766 | B1 | 8/2010 | Dubrovsky | |
| 7,778,999 | B1 * | 8/2010 | Boisjolie | G06F 17/30867 707/722 |
| 8,015,169 | B1 | 9/2011 | Gmuender | |
| 9,015,199 | B1 | 4/2015 | Gmuender | |
| 9,405,839 | B2 | 8/2016 | Gmuender | |
| 2001/0047429 | A1 | 11/2001 | Seng et al. | |
| 2002/0073167 | A1 * | 6/2002 | Powell | H04L 12/5692 709/217 |
| 2002/0073335 | A1 | 6/2002 | Shuster | |
| 2003/0005455 | A1 * | 1/2003 | Bowers | H04N 7/17336 725/90 |
| 2003/0191971 | A1 * | 10/2003 | Klensin | G06F 21/6218 726/5 |
| 2004/0006621 | A1 * | 1/2004 | Bellinson | G06F 17/30867 709/225 |
| 2006/0168088 | A1 | 7/2006 | Leighton et al. | |
| 2007/0239865 | A1 | 10/2007 | Tout | |
| 2015/0178398 | A1 | 6/2015 | Gmuender | |

OTHER PUBLICATIONS

Mockapetris, P., "Domain Names—Concepts and Facilities", Network Working Group, Nov. 1987, 55 pages.
Mockapetris, P., "Domain Names—Implementation and Specification", Network Working Group, Nov. 1987, 55 pages.
"Websense Enterprise Product Overview", Internet Filter Websense Enterprise, http://www.websense.com/products/about/Enterprise/, 4 pages.
U.S. Appl. No. 10/853,557; Final Office Action dated Aug. 24, 2010.
U.S. Appl. No. 10/853,557; Office Action dated Mar. 30, 2010.
U.S. Appl. No. 10/853,557; Final Office Action dated Jan. 11, 2010.
U.S. Appl. No. 10/853,557; Office Action dated Aug. 20, 2009.
U.S. Appl. No. 10/853,557; Final Office Action dated Mar. 29, 2009.
U.S. Appl. No. 10/853,557; Office Action dated Aug. 21, 2008.
U.S. Appl. No. 10/853,557; Office Action dated Aug. 31, 2007.
U.S. Appl. No. 10/853,557; Final Office Action dated May 1, 2007.
U.S. Appl. No. 10/853,557; Office Action dated Nov. 14, 2006.
U.S. Appl. No. 13/226,376; Office Action dated May 27, 2014.
U.S. Appl. No. 13/226,376; Final Office Action dated Jan. 2, 2014.
U.S. Appl. No. 13/226,376; Office Action dated Sep. 4, 2013.
U.S. Appl. No. 13/226,376; Final Office Action dated May 8, 2013.
U.S. Appl. No. 13/226,376; Office Action dated Dec. 4, 2012.
U.S. Appl. No. 14/638,298; Office Action dated Oct. 5, 2015.
U.S. Appl. No. 10/853,447; Office Action dated Sep. 14, 2009.
U.S. Appl. No. 10/853,447; Final Office Action dated Apr. 9, 2009.
U.S. Appl. No. 10/853,447; Office Action dated Sep. 12, 2008.
U.S. Appl. No. 10/853,447; Final Office Action dated Jun. 3, 2008.
U.S. Appl. No. 10/853,447; Office Action dated Jan. 10, 2008.
U.S. Appl. No. 10/853,447; Final Office Action dated Aug. 23, 2007.
U.S. Appl. No. 10/853,447; Office Action dated Nov. 15, 2006.

* cited by examiner

REQUESTING WEB PAGES AND CONTENT RATING INFORMATION

CROSS-REFERENCE TO RELATED APPLICATIONS

This application is a continuation and claims the priority benefit of U.S. patent application Ser. No. 14/638,298 filed Mar. 4, 2015, now U.S. Pat. No. 9,405,839, which is a continuation and claims the priority benefit of U.S. patent application Ser. No. 13/226,376 filed Sep. 6, 2011, now U.S. Pat. No. 9,015,199, which is a continuation and claims the priority benefit of U.S. patent application Ser. No. 10/853,557 filed May 24, 2004, now U.S. Pat. No. 8,015,169, the disclosures of which are incorporated herein by reference.

BACKGROUND OF THE INVENTION

Field of the Invention

The present invention relates to web pages, and more particularly, to requesting content rating information of web pages.

Description of the Related Art

Today, various content filtering mechanisms are provided to entities to manage and/or control user access to the Internet via facilities provided by the entities. For example, a company typically implements some form of content filtering mechanism to control the use of the company's computers and/or servers to access the Internet. Access to content within certain predetermined categories using the company's computers and/or servers may not be allowed during some predetermined periods of time.

One conventional content filtering mechanism is described below. A typical content filtering client, which resides in a firewall device, sends a request for the content rating of a web page in response to each web page browsed. The content rating requests are routed to a separate content rating server. When the content rating server receives a request, the content rating server retrieves the content rating for that request from a database and sends the content rating to the content filtering client.

Based on the content rating retrieved, the content filtering client determines whether the user is allowed to access the web page. If the user is allowed, then a request is sent to get the web page from the host of the web page. Otherwise, no request is sent to the web page host. Thus, the content filtering client typically receives the content rating before requesting the web page. As a result, a delay in getting the content rating may increase the latency in delivering the web page to the user in some existing systems. Depending on how long it takes the content filtering client to get the content rating, the user may experience a noticeable delay in accessing the web page. As such, the communication time and frequency with the content rating server (e.g., proximity, server performance, etc.) affects the performance of this process, but such content rating servers are relatively expensive as compared to network bandwidth.

SUMMARY OF THE PRESENTLY CLAIMED INVENTION

The present invention involves methods and apparatuses for requesting web pages and content rating information. In one embodiment, a method for filtering web content includes receiving a request for a web page from a client computing device communicatively coupled to the network access device. The method further includes executing a web content filtering application stored in memory of the network access device. Execution of the web content filtering application by a processor of the network access device causes the network access device to forward the request for the web page to a web page host communicatively coupled to the network access device. The network access device retrieves a content rating for the web page from a storage device of the network access device when the content rating is locally available in the storage device. The network access device further generates a content rating domain name service (CR DNS) request. The CR DNS request contains a web page identifier that causes DNS servers to distinguish the CR DNS request from a standard DNS request used to request mapping information. The network access device sends the CR DNS request for the content rating to a DNS infrastructure when the content rating is not locally available in the storage device of the network access device. The network access device further receives a CR DNS response containing the content rating from the DNS infrastructure and receives the web page from the web page host. The network access device forwards the web page to the client computing device when the content rating contained in the CR DNS response indicates the client computing device is permitted to access the web page.

In a further embodiment, a non-transitory computer-readable storage medium stores an executable program that, when executed by a processor, effectuates the foregoing method for filtering web content. In a still further embodiment, a web content filtering system includes a network access device and a plurality of DNS servers communicatively coupled to a network. The network access device includes an executable web content filtering application stored in memory. Execution of the web content filtering application by the processor effectuates the foregoing method for filtering web content.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and an apparatus to request web pages and content rating information thereof are described. In the following description, numerous specific details are set forth. However, it is understood that embodiments of the invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment is included in at least one embodiment of the invention.

The appearances of the phrase "in one embodiment" in various places in the specification do not necessarily all refer to the same embodiment.

Figure 1:
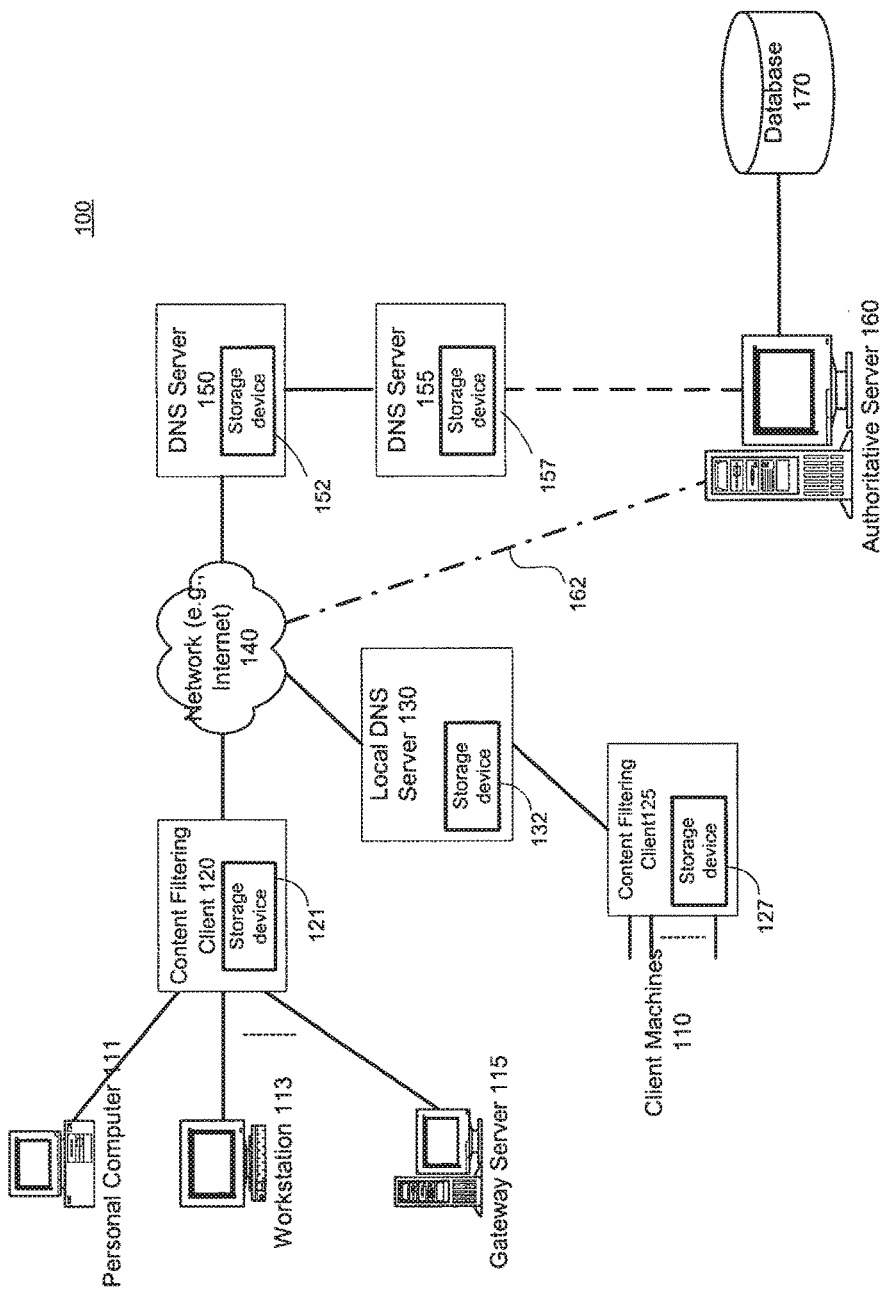
FIG. 1 illustrates a networked system usable with one embodiment of the invention.

FIG. 1 shows a networked system usable with one embodiment of the invention. The system 100 includes a first set of client machines, including, but not limited to, a personal computer 111, a workstation 113, and a gateway server 115; a first content filtering client 120; a second set of client machines 110; a second content filtering client 125; a local domain name service (DNS) server 130; a network 140; a DNS infrastructure, including, but not limited to, an authoritative server 160 and a database 170. In some embodiments, the DNS infrastructure further includes one or more DNS servers, such as a first DNS server 150 and a second DNS server 155 in FIG. 1.

Note that any or all of the components and the associated hardware illustrated in FIG. 1 may be used in various embodiments of the networked system 100. However, it should be appreciated that other configurations of the networked system 100 may include more or less devices than those shown in FIG. 1.

Referring to FIG. 1, the personal computer 111, the workstation 113, and the gateway server 115 are coupled to the first content filtering client 120. Likewise, the second set of client machines 110 is coupled to the second content filtering client 125. One should appreciate that the personal computer 111, the workstation 113, and the gateway server 115 are used as examples in FIG. 1 to illustrate the concept. Different types and/or combinations of client machines may be included in various embodiments.

Each of the content filtering clients 120 and 125 includes a local storage device 121 and 127, respectively. The local storage devices 121 and 127 may include any of various types of machine readable media, such as, for example, random access memory (RAM), dynamic random access memory (DRAM), flash memory, etc.

The content filtering clients 120 and 125 may be further coupled to the network 140, directly or indirectly. For example, the content filtering client 125 is coupled to the network 140 via the local DNS server 130 while the content filtering client 120 is directly coupled to the network 140. The network 140 may include a local area network (LAN), or a wide area network (WAN), etc. In one embodiment, the network 140 includes an Internet. The network 140 is further coupled to the authoritative server 160 in the DNS infrastructure. In some embodiments, the network 140 is coupled to the authoritative server 160 via one or more DNS servers (e.g., the DNS servers 150 and 155). Furthermore, the various components and the associated hardware shown in FIG. 1 may be coupled to each other via wired connections, wireless connections, or a combination of both.

One feature of the DNS infrastructure is its distributed nature. In one embodiment, the DNS infrastructure is a distributed database used by Transfer Control Protocol/Internet Protocol (TCP/IP) applications to map between hostnames and Internet Protocol (IP) addresses and to provide electronic mail routing information. Note that the hostname to IP address mapping may not be centrally located in a single database. Instead, each site (such as a company, campus, or department) maintains the site's own database of such mappings and runs one or more server programs on one of the DNS servers. Other systems communicably coupled to the DNS server via the Internet may query the DNS server for mapping information. A request sent to the DNS infrastructure for mapping information is hereinafter referred to as a standard DNS request. Likewise, a response to a standard DNS request is herein referred to as a standard DNS response.

In addition to the distributed nature of the DNS infrastructure, another feature of the DNS infrastructure involves the ability of a DNS server to locally store or to cache certain predetermined information. For example, each of the DNS servers 150 and 155 in FIG. 1 includes a local storage device 152 and 157, respectively. The local storage devices 152 and 157 may include any of various types of memory devices, such as, for example, random access memory (RAM), dynamic random access memory (DRAM), flash memory, etc. A DNS server may store responses routed through the DNS server in the local storage device within the DNS server. Using the locally stored responses, the DNS server may be able to respond to subsequent requests for the same information. The responses stored in the DNS server may be maintained for a predetermined period of time. In one embodiment, the predetermined period is specified by a time-to-live (TTL) parameter in the responses. By locally storing the responses in the storage device of the DNS server, the time for responding to the subsequent requests can be reduced because the further requests are not routed to additional servers. Likewise, the volume of network traffic for transmitting DNS responses may also be reduced.

Instead of coupling to the authoritative server 160 via the DNS infrastructure, the network 140 is directly connected to the authoritative server 160 in some embodiments. For example, the dotted line 162 in FIG. 1 represents such a direct connection. The authoritative server 160 is further coupled to a database 170, which the authoritative server 160 may access to retrieve content rating information of web pages. In one embodiment, the database 170 is maintained by a content filtering service provider. Web pages may be evaluated automatically or manually to generate content rating of the web pages. The content filtering service provider may update the database 170 with the content rating generated.

Figure 2:
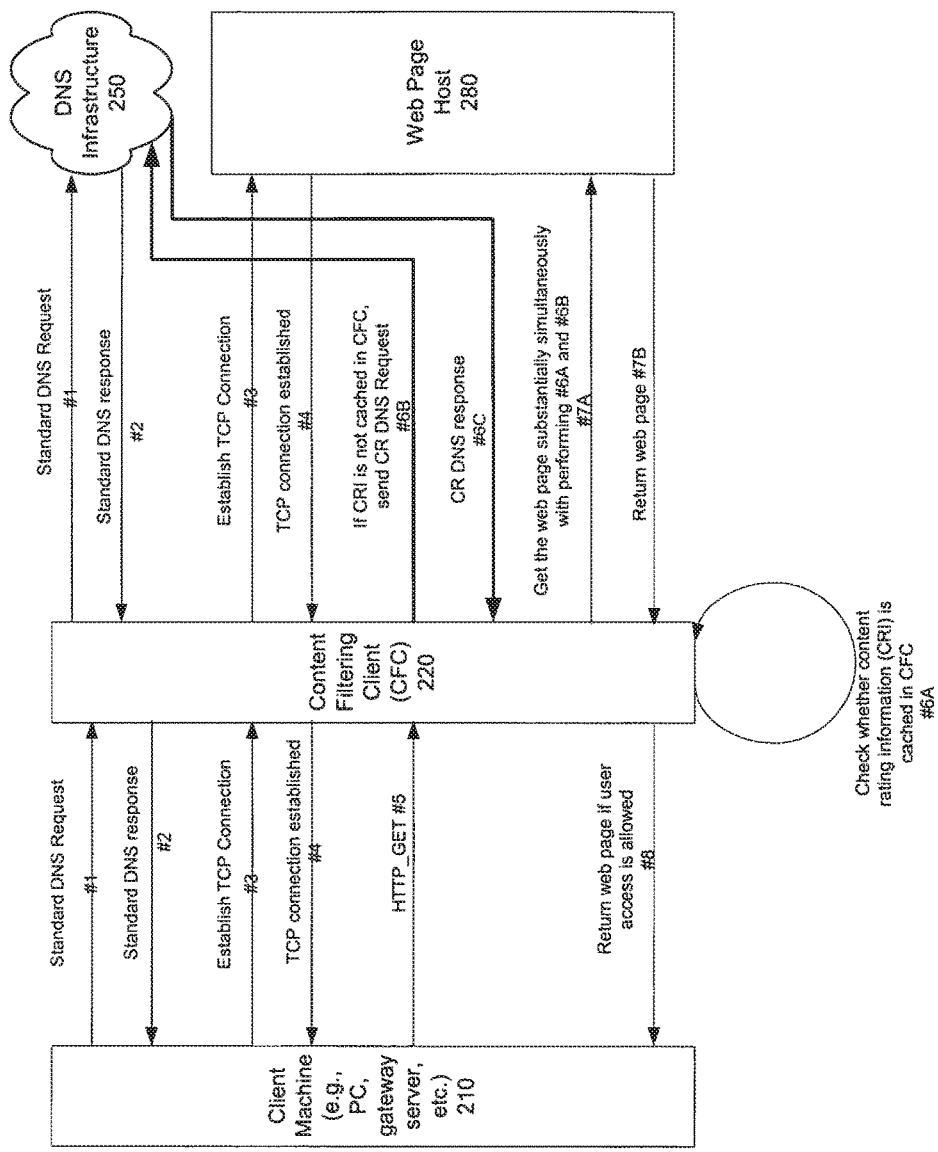
FIG. 2 illustrates a call diagram of one embodiment of a process for requesting web pages and content rating information of the web pages in response to a user request.

FIG. 2 illustrates a call diagram of one embodiment of a process to request web pages and content rating thereof. Some exemplary requests and responses between a client machine 210, a content filtering client (CFC) 220, a web page host 280, and a DNS infrastructure 250 are shown in FIG. 2 for the purpose of illustrating the concept. However, some embodiments of the present invention may include more or less requests and/or responses than those illustrated in FIG. 2. Furthermore, although the embodiment shown in FIG. 5 uses a proxy for content filtering, one should appreciate that the technique disclosed is also applicable to other types of content filtering, such as Stateful Packet Inspection (SPI). Referring to FIG. 2, the client machine 210 may include the personal computer 111, the workstation 113, and the gateway server 115 shown in FIG. 1. The CFC 220 may be run on any network access device, such as modems, routers, firewalls, etc. The DNS infrastructure 250 may include any number of DNS servers (e.g., the DNS servers 150 and 155 in FIG. 1) and an authoritative server (e.g., the authoritative server 160 in FIG. 1).

Referring to FIG. 2, the client machine 210 sends a standard DNS request #1 to the CFC 220 to request the IP address of a web page. The CFC 220 forwards the standard DNS request #1 to the DNS infrastructure 250. In response to the standard DNS request #1, the DNS infrastructure 250 sends a standard DNS response #2 containing the IP address of the web page to the CFC 220. Then the CFC 220 forwards the standard DNS response #2 to the client machine 210.

Using the IP address of the web page, the client machine 210 establishes a Transfer Control Protocol (TCP) connection #3 with the CFC 220. Likewise, the CFC 220 also establishes a TCP connection #3 with the web page host 280 using the IP address. When the TCP connection #3 is established, the web page host 280 sends a confirmation #4 to the CFC 220 to indicate so. Likewise, the CFC 220 sends a confirmation #4 to the client machine 210.

Via the TCP connection #3, the client machine 210 sends a request #5 for the web page to the CFC 220. In one embodiment, the client machine 210 uses the Hypertext Transfer Protocol (HTTP). The request #5 may include one or more HTTP commands, such as HTTP_GET, HTTP_POST, HTTP_INFO, etc. In response to the request #5, the CFC 220 checks whether the content rating information (CRI) of the web page is locally stored in the CFC 220 (process #6A). Based on the CRI, the CFC 220 may determine whether the client machine 210 is allowed to access the web page. If the CRI is not available in the CFC 220, then the CFC 220 requests the CRI from the DNS infrastructure 250. To request the CRI, the CFC 220 may send a Content Rating (CR) DNS request #6B to the DNS infrastructure 250. Unlike the standard DNS requests, which are sent to query mapping information of web pages, the CR DNS requests are sent to request CRI of web pages. Details of the CR DNS requests are discussed below with reference to FIG. 3. In response to the CR DNS request #6B, the DNS infrastructure 250 sends a CR DNS response #6C including the CRI to the CFC 220. The DNS response #6C may be routed through any DNS servers that the DNS request #6B has passed through. Furthermore, these DNS servers may store a copy of the CR DNS response #6C locally before forwarding the CR DNS response #6C. In one embodiment, the CRI in the CR DNS response #6C is encrypted for security.

Unlike the existing approach, the CFC 220 sends a request #7A for the web page to the web page host 280 prior to getting the CRI of the web page. Since the CFC 220 does not wait for checking the CRI before requesting the web page, the potential delay in forwarding the web page to the client machine 210 is reduced. In one embodiment, the CFC 220 sends the CR DNS request #6B and the request for the web page #7A substantially simultaneously or substantially in parallel. Alternatively, the CFC 220 may send the request for the web page #7A and check whether the CRI is locally stored in the CFC 220 (process #6A) substantially simultaneously or substantially in parallel.

In response to the request #7A for the web page, the web page host 280 sends the web page #7B to the CFC 220. If the CRI arrives at the CFC 220 before the web page does, then the CFC 220 uses the CRI to determine whether the client machine 210 is allowed to access the web page. If access is allowed, the CFC 220 forwards the web page #8 to the user. Otherwise, the CFC 220 does not forward the web page to the user. Instead, the CFC 220 may send a predetermined page or a notice to inform the client machine 210 that access to the requested web page is not allowed.

However, if the web page arrives at the CFC 220 before the CRI does, then the CFC 220 may hold the web page and wait for the CRI for a predetermined period of time. When the predetermined period expires and the CRI still has not arrived, the CFC 220 may nevertheless forward the web page #8 to the client machine 210. Otherwise, if the CRI arrives before the predetermined period expires, the CFC 220 uses the CRI to determine whether the client machine 210 is allowed to access the web page. If access is allowed, the CFC 220 forwards the web page to the user (#8).

Otherwise, the CFC 220 does not forward the web page to the user. Instead, the CFC 220 may send a predetermined page or a notice to inform the client machine 210 that access to the requested web page is not allowed. In some embodiments, the CRI arrived is encrypted, and thus, the CFC 220 decrypts the CRI.

Figure 3:
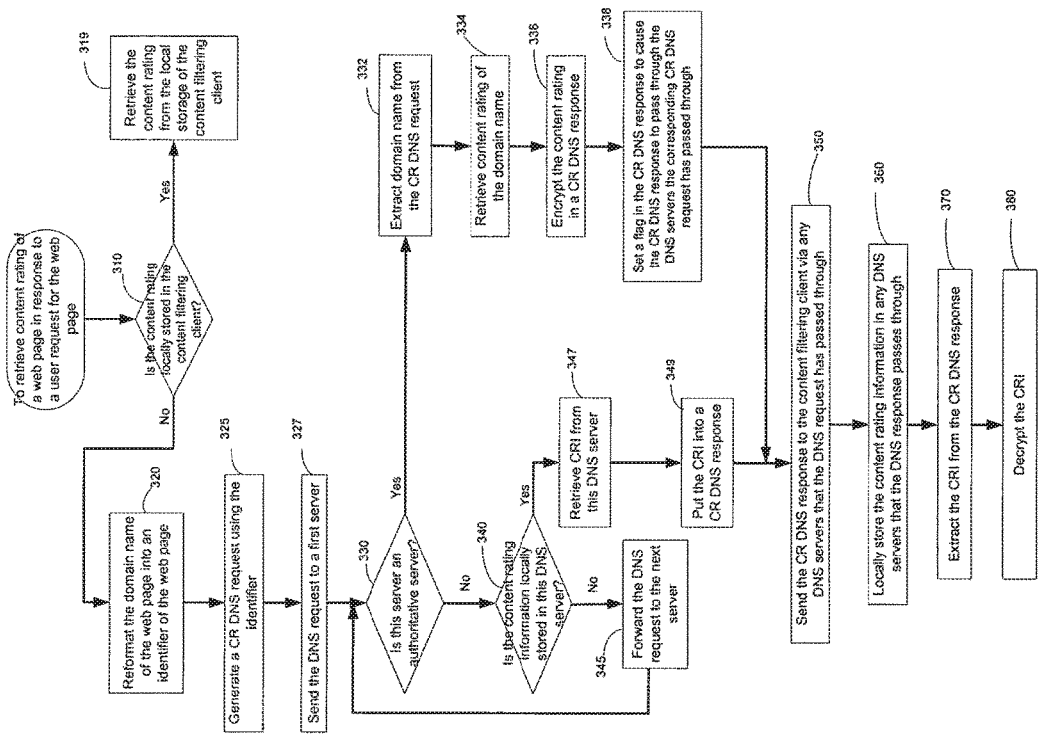
FIG. 3 illustrates a flow diagram of one embodiment of a process for getting content rating information of a web page.

FIG. 3 illustrates a flow diagram of one embodiment of a process for getting content rating information (CRI) of a web page in response to a user request for the web page. The process is performed by processing logic that may comprise hardware (e.g., circuitry, dedicated logic, etc.), software (such as is run on a general-purpose computer system or a dedicated machine), or a combination of both.

Referring to FIG. 3, processing logic determines whether the CRI of the web page is locally stored in the content filtering client (CFC) (processing block 310). For example, the CFC may include a local storage device (e.g., the local storage device 121 in the content filtering client 120 in FIG. 1) to store the CRI for a predetermined period of time. In some embodiments, a flag or an indicator (e.g., a time-to-live (TTL) parameter) may be stored with the CRI to indicate when the CRI expires. If the CRI is locally stored in the CFC, processing logic retrieves the CRI from the local storage device of the CFC (processing block 319). In some embodiments, the locally stored CRI is encrypted. Therefore, processing logic may decrypt the retrieved CRI. If the CRI is not locally stored in the content filtering client, then processing logic may perform additional operations to get the CRI as described below.

In one embodiment, if the CRI is not locally stored in the CFC, processing logic sends a request for the CRI to a DNS infrastructure (e.g., the DNS infrastructure 250 in FIG. 2). The request may be referred to as a CR DNS request. Processing logic may reformat the domain name of the web page into an identifier of the web page (processing block 320). For example, a domain name, "www.xyz.com" supplied from a client application via a HTTP_GET, may be converted into another format, such as "www.xyz.com.PORT/PROTOCOL/WEBSERVER IP.webcfs.com". Then processing logic generates a CR DNS request including the identifier of the web page (processing block 325). DNS servers may distinguish the CR DNS request from standard DNS requests by the identifier. Processing logic sends the CR DNS request generated to a first server (processing block 327).

Then processing logic determines whether this server is an authoritative server (e.g., the authoritative server 160 in FIG. 1). If this is an authoritative server, processing logic extracts the domain name or the Uniform Resource Locator (URL) of the web page from the identifier in the CR DNS request (processing block 332). Processing logic retrieves the CRI using the domain name or URL from a database coupled to the authoritative server (processing block 334). Processing logic then encrypts the CRI into a CR DNS response (processing block 336). Furthermore, processing logic may set a flag or write in a predetermined field in the CR DNS response to cause the CR DNS response to pass through the same set of DNS servers the CR DNS request has passed through, if any (processing block 338). In some embodiments, the DNS servers locally store or cache the CR DNS response as the CR DNS response passes through the DNS servers. Then processing logic transitions to processing block 350.

Otherwise, if this is not an authoritative server, this server is a DNS server (e.g., the DNS servers 150 and 155 in FIG. 1). Processing logic checks whether the CRI is locally stored in the DNS server (processing block 340). The locally stored CRI may be encrypted to protect the CRI. If the CRI is not locally stored in the DNS server, processing logic forwards the DNS request to a next server coupled to this DNS server (processing block 345) and repeats processing block 330. If the CRI is locally stored in the DNS server, processing logic retrieves the CRI from this DNS server (processing block 347) and puts the CRI into a CR DNS response (processing block 349). Then processing logic transitions to processing block 350.

Processing logic sends the CR DNS response to the content filtering client (processing block 350). As mentioned above, processing logic may set a flag or write in a field of the CR DNS response to send the CR DNS response via any DNS servers that the DNS request has passed through. Processing logic may also store the CRI in the CR DNS response, or the entire CR DNS response, in one or more local storage devices (e.g., the storage devices 152 and 157) of any DNS servers that the DNS response passes through (processing block 360). In some embodiments, the CRI is maintained in the local storage of the DNS servers for a predetermined period specified by a time-to-live (TTL) parameter in the CR DNS response. By locally storing CRI, the DNS servers can respond to subsequent CR DNS requests for the stored CRI without forwarding the subsequent CR DNS requests to another server. Therefore, the overall network traffic for transmitting CR DNS requests and CR DNS responses may be reduced. Likewise, the latency in responding to the subsequent CR DNS requests may be reduced.

Referring back to FIG. 3, when a CR DNS response arrives at the content filtering client, processing logic extracts the CRI from the CR DNS response (processing block 370). In some embodiments, the CRI has been encrypted, and thus, processing logic decrypts the CRI (processing block 380). Based on the CRI, processing logic determines whether the user is allowed to access the web page requested.

The technique disclosed above takes advantage of the distributed nature of the DNS infrastructure to improve the efficiency in getting the CRI because processing logic may not have to access the authoritative server and the database every time the CRI is requested. As discussed above, the CRI may be available in the local storage of one or more of the DNS servers, which the CR DNS response containing the CRI has passed through before, and thus, the overall traffic for getting CRI may be reduced. Furthermore, the above technique allows processing logic to leverage an existing architecture (e.g., the existing DNS infrastructure) to get CRI as well as to store CRI. Hence, the overall cost of the content filtering mechanism can be reduced.

Figure 4:
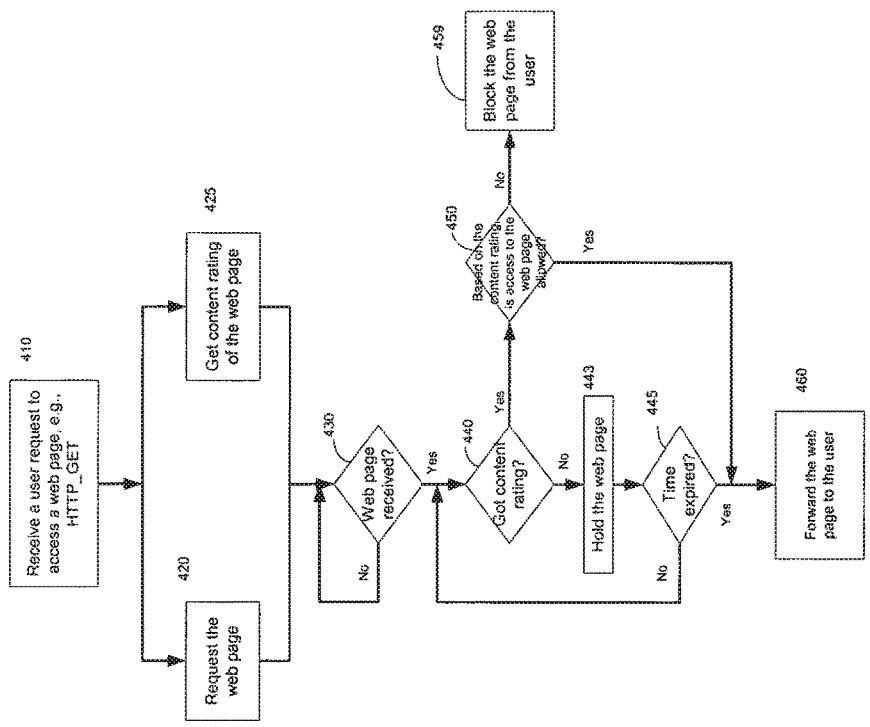
FIG. 4 illustrates a flow diagram of one embodiment of a process for requesting a web page and content rating information of the web page substantially in parallel.

FIG. 4 illustrates a flow diagram of one embodiment of a process for requesting a web page and content rating information thereof. The process is performed by processing logic that may comprise hardware (e.g., circuitry, dedicated logic, etc.), software (such as is run on a general-purpose computer system or a dedicated machine), or a combination of both.

Referring to FIG. 4, processing logic receives a user request to access a web page (processing block 410). The request may include a HTTP_GET. In response to the user request, processing logic requests the web page from a web page host (processing block 420) and gets the CRI of the web page (processing block 425) substantially in parallel or substantially simultaneously. One embodiment of a process for getting the CRI of the web page has been discussed in detail above with reference to FIG. 3.

Processing logic then checks whether the web page has arrived (processing block 430). If not, processing logic stays in processing block 430 until the web page arrives. In some embodiments, processing logic may time-out and send an error message to the user if the web page fails to arrive within a predetermined period of time.

When the web page has arrived, processing logic checks whether the CRI has also arrived (processing block 440). If the CRI has arrived, processing logic determines whether the user is allowed to access the web page using the CRI (processing block 450). Processing logic forwards the web page to the user if user access to the web page is allowed (processing block 460). If access is not allowed, processing logic blocks the web page from the user (processing block 459). In some embodiments, processing logic may send a notification or a blocked content page to inform the user that access is not allowed.

Referring back to processing block 440, if the CRI has not arrived yet, processing logic may hold the web page (processing block 443) and check whether a predetermined period of time has expired (processing block 445). If the predetermined period of time has not expired, processing logic may repeat processing block 440. Otherwise, processing logic may go ahead to forward the web page to the user (processing block 460).

Independent of leveraging the DNS infrastructure to transmit CRI, the technique of requesting the web page and the CRI substantially in parallel provides the advantage of reducing the potential latency due to the retrieval of the CRI. Note that the technique of requesting the web page and the CRI substantially in parallel may be applicable to systems having various configurations to transmit CRI (e.g., systems leveraging DNS infrastructure, systems having separate dedicated servers and/or network to transmit CRI, etc.). Unlike the conventional approach, in which the web page request is not sent until it is determined whether the user is allowed to access the web page, the technique discussed above sends the web page request before receiving the CRI. Therefore, the technique discussed above may reduce the latency in delivering the web page to the user due to the retrieval of the CRI and/or determination of whether user access is allowed. By combining the technique of requesting web page and CRI substantially in parallel with the technique of leveraging the DNS infrastructure to transmit CRI, the latency in transmitting the CRI via the DNS infrastructure may be reduced.

Some portions of the preceding detailed description have been presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will appear from the description below. In addition, the present invention is not described with reference to any particular programming language. It will be appreciated that a variety of programming languages may be used to implement the teachings of the invention as described herein.

A machine-accessible medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A method for filtering a service request, the method comprising:
receiving a content rating domain name service (CR DNS) request for accessing a service at an authoritative server, the request sent from a computing device communicatively coupled to the authoritative server and a host computer having access to data related to the request that includes content rated by content rating information, wherein the data related to the request is to be sent to the computing device before a CR DNS response is received at the computing device;
executing instructions stored in memory, wherein the execution of the instructions by a processor of the authoritative server:
extracts a domain name or a Uniform Resource Locator (URL) from the request;
retrieves the content rating information relating to the request from a database coupled to the authoritative server, the retrieved content rating information based on the extracted domain name or URL;
encrypts the retrieved content rating information into the CR DNS response; and
sets a flag in the CR DNS response, the flag indicating that the CR DNS response is to be passed via a specified set of one or more DNS servers; and
sending the CR DNS response to the computing device via the network interface and via the specified set of one or more DNS servers based on the flag set in the CR DNS response, wherein the data related to the request is sent to the computing device before the CR DNS response is received at the computing device and client access to the data related to the request is either allowed or is blocked based on the content rating information included in the CR DNS response.

2. The method of claim 1, wherein the CR DNS request is received over a direct connection that connects the authoritative server over the internet to at least one of a content filtering client, a personal computer, a workstation, and a gateway server.

3. The method of claim 1, wherein the CR DNS request is received via one or more DNS servers and the computing device identifies that the data is allowed be sent to a client device based on the rated content and the content rating information included in the CR DNS request.

4. The method of claim 3, wherein the flag in the CR DNS response identifies that the specified set of one or more DNS servers corresponds to the one or more DNS servers that receive the CR DNS request.

5. The method of claim 4, wherein the CR DNS response is passed through the one or more DNS servers based on the flag.

6. The method of claim 4, wherein at least one of the one or more DNS servers store in a local cache information corresponding to the CR DNS response including the flag.

7. A non-transitory computer-readable storage medium having embodied thereon a program executable by a processor or implementing a method for filtering a service request, the method comprising:
receiving a content rating domain name service (CR DNS) request for accessing a service at an authoritative server, the request sent from a computing device communicatively coupled to the authoritative server and a host computer having access to data related to the request, the data related to the request including content rated by content rating information, wherein the data related to the request is to be received at the computing device before a CR DNS response is sent to the computing device;
extracting a domain name or a Uniform Resource Locator (URL) from the request;
retrieving the content rating information relating to the request from a database coupled to the authoritative server, the retrieved content rating information based on the extracted domain name or URL;
encrypting the retrieved content rating information into a CR DNS response;
setting a flag in the CR DNS response, the flag indicating that the CR DNS response is to be passed via a specified set of one or more DNS servers; and
sending the CR DNS response to the computing device via the specified set of one or more DNS servers based on the flag set in the CR DNS response, wherein the data related to the request is sent to the computing device before the CR DNS response is received at the computing device and client access to the data related to the request is either allowed or is blocked based on the content rating information included in the CR DNS response.

8. The non-transitory computer-readable storage medium of claim 7, wherein the CR DNS request is received over a direct connection that connects the authoritative server over the internet to at least one of a content filtering client, a personal computer, a workstation, and a gateway server.

9. The non-transitory computer-readable storage medium of claim 7, wherein the CR DNS request is received via one or more DNS servers and the computing device identifies that the data is allowed be sent to a client device based on the rated content and the content rating information included in the CR DNS request.

10. The non-transitory computer-readable storage medium of claim 9, wherein the flag in the CR DNS response identifies that the specified set of one or more DNS servers corresponds to the one or more DNS servers that receive the CR DNS request.

11. The non-transitory computer-readable storage medium of claim 10, wherein the CR DNS response is passed through the one or more DNS servers based on the flag.

12. The non-transitory computer-readable storage medium of claim 10, wherein at least one of the one or more DNS servers store in a local cache information corresponding to the CR DNS response.

13. An apparatus for filtering a service request, the apparatus comprising:
an authoritative server comprising:
a communication interface that receives a content rating domain name service (CR DNS) request for accessing a service for accessing data that includes content rated by content rating information, the request from a computing device; and
a processor that executes instructions stored in memory, wherein execution of the instructions by the processor:
extracts a domain name or a Uniform Resource Locator (URL) from the request,
retrieves the content rating information relating to the request from a database coupled to the authoritative server, the retrieved content rating information based on the extracted domain name or URL,
encrypts the retrieved content rating information into a CR DNS response for transmission over the network communications interface, and
sets a flag in the CR DNS response, the flag indicating that the CR DNS response is to be passed via a specified set of one or more DNS servers, wherein the CR DNS response is transmitted to the computing device via the communication interface and via the specified set of one or more DNS servers based on the flag set in the CR DNS response, wherein:
the computing device is communicatively coupled to the authoritative server and a host computer having access to data related to the request,
the data related to the request is to be sent to the computing device before the CR DNS response is sent to the computing device,
the data related to the request is sent to the computing device before the CR DNS response is received at the computing device, and
client access to the data related to the request is either allowed or is blocked based on the content rating information included in the CR DNS response.

14. The apparatus of claim 13, wherein the network communication network is directly connected to the internet to at least one of a content filtering client, a personal computer, a workstation, and a gateway server.

15. The apparatus of claim 13, wherein the CR DNS request is received via one or more DNS servers and the computing device identifies that the data is allowed be sent to a client device based on the rated content and the content rating information included in the CR DNS request.

16. The apparatus of claim 15, wherein the flag in the CR DNS response identifies that the specified set of one or more DNS servers corresponds to the one or more DNS servers that receive the CR DNS request.

17. The apparatus of claim 16, wherein the CR DNS response is passed through the one or more DNS servers based on the flag.

18. The method of claim 1, wherein the data related to the request is received from the host computer at the computing device before the CR DNS request is sent from the authoritative server, the computing device holding at least a portion of data received from the host computer until after the CR DNS response is sent by the authoritative server, the computing device identifies whether a client device is allowed to receive the requested data based at least in part on the content rating information included in the CR DNS response, and the at least portion of the data held at the computing device is sent to the client device when the client device is identified as being allowed to receive the requested data.

19. The non-transitory computer-readable storage medium of claim 7, wherein the data related to the request is received from the host computer at the computing device before the CR DNS request is sent from the authoritative server, the computing device holding at least a portion of data received from the host computer until after the CR DNS response is sent by the authoritative server, the computing device identifies whether a client device is allowed to receive the requested data based at least in part on the content rating information included in the CR DNS response, and the at least portion of the data held at the computing device is sent to the client device when the client device is identified as being allowed to receive the requested data.

20. The apparatus of claim 13, wherein the data related to the request is received from the host computer at the computing device before the CR DNS request is sent from the authoritative server, the computing device holding at least a portion of data received from the host computer until after the CR DNS response is sent by the authoritative server, the computing device identifies whether a client device is allowed to receive the requested data based at least in part on the content rating information included in the CR DNS response, and the at least portion of the data held at the computing device is sent to the client device when the client device is identified as being allowed to receive the requested data.

* * * * *